(12) United States Patent
Kraus

(10) Patent No.: US 6,264,393 B1
(45) Date of Patent: Jul. 24, 2001

(54) CONNECTION UNIT BETWEEN A SUPPORT, SPECIFICALLY A BODY PART OF A MOTOR VEHICLE AND A PLATE ELEMENT

(75) Inventor: Willibald Kraus, Gründstadt (DE)

(73) Assignee: TRW Automotive Electronics & Components GmbH & Co. KG (DE)

(*) Notice: Subject to any disclaimer, the term of this patent is extended or adjusted under 35 U.S.C. 154(b) by 0 days.

(21) Appl. No.: 09/323,509

(22) Filed: Jun. 1, 1999

(30) Foreign Application Priority Data

Jun. 10, 1998 (DE) .......................... 298 10 437 U

(51) Int. Cl.$^7$ .............................. B25G 3/28; F16B 3/28; F16G 11/00
(52) U.S. Cl. .............................. 403/282; 411/48; 411/41; 411/371.1; 24/297
(58) Field of Search .................... 403/282, 281, 403/280, 321, 322.1, 322.3, 322.4, 325, 326, 329; 411/41, 45, 46, 48, 371.1, 542; 24/297, 453, 607

(56) References Cited

U.S. PATENT DOCUMENTS

| | | | |
|---|---|---|---|
| 2,937,834 | 5/1960 | Orenick et al. | 248/71 |
| 4,568,215 | * 2/1986 | Nelson | 403/13 |
| 4,810,147 | * 3/1989 | Hirohata | 411/439 |
| 4,861,208 | * 8/1989 | Boundy | 411/339 |
| 4,874,276 | * 10/1989 | Iguchi | 411/48 |
| 4,921,371 | * 5/1990 | Boiraeu et al. | 403/408.1 |
| 5,211,519 | * 5/1993 | Saito | 411/45 |
| 5,236,272 | * 8/1993 | Hibbard | 403/24 |
| 5,373,611 | * 12/1994 | Murata | 24/297 |
| 5,387,065 | * 2/1995 | Sullivan | 411/48 |
| 5,419,606 | 5/1995 | Hull et al. | |
| 5,507,610 | * 4/1996 | Benedetti et al. | 411/339 |
| 5,850,676 | * 12/1999 | Takahashi et al. | 24/297 |
| 6,039,523 | * 3/2000 | Kraus | 411/48 |

FOREIGN PATENT DOCUMENTS

| | | |
|---|---|---|
| 44 38 309 A1 | 6/1995 | (DE) . |
| 197 21 314 A1 | 11/1997 | (DE) . |
| 297 18 487 U1 | 2/1998 | (DE) . |
| 297 18 487 U1 | 2/1998 | (DE) . |
| 0 672 836 A1 | 9/1995 | (EP) . |
| 0 717 202 A1 | 6/1996 | (EP) . |
| 0 735 285 A1 | 10/1996 | (EP) . |
| 743591 | 1/1956 | (GB) . |
| 2 323 121 | 9/1998 | (GB) . |

* cited by examiner

Primary Examiner—Lynne H. Browne
Assistant Examiner—John B. Walsh
(74) Attorney, Agent, or Firm—Fay, Sharpe, Fagan, Minnich & McKee, LLP

(57) ABSTRACT

A connection element (1) between a support (2), specifically a body part of a motor vehicle, and a plate element, specifically a door or wall facing. The connection element (1) includes an upper piece (3) attachable to the plate element and a lower piece (4) connectable with a support (2). A neck-shaped intermediate region (5) is provided between the upper part (3) and the lower part (4). The intermediate region (5) is equipped with locking elements (10) and penetrates into a support opening (7) embeddable contact piece (12). The intermediate region (5) above the support (2) is surrounded by a casing part (15), which is lockable with the locking elements (10) and the contact piece (12). A sealing element (20), which acts upon the surface of the support (2), is arranged between a casing piece (15) and a contact piece (12).

20 Claims, 2 Drawing Sheets

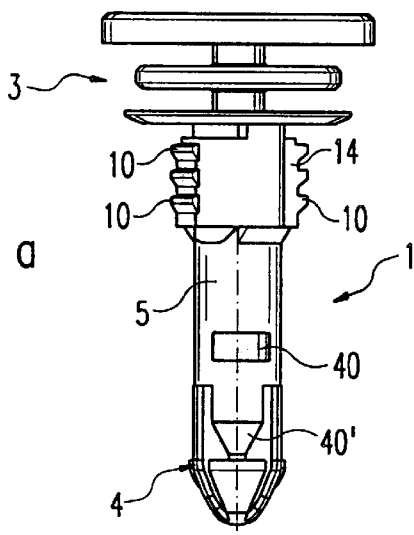
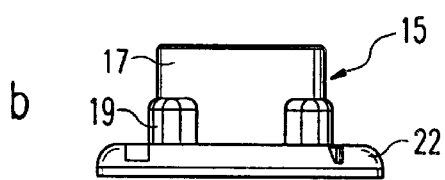
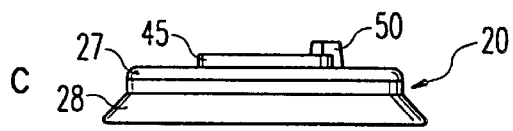
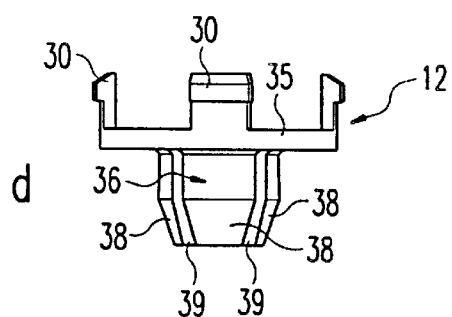
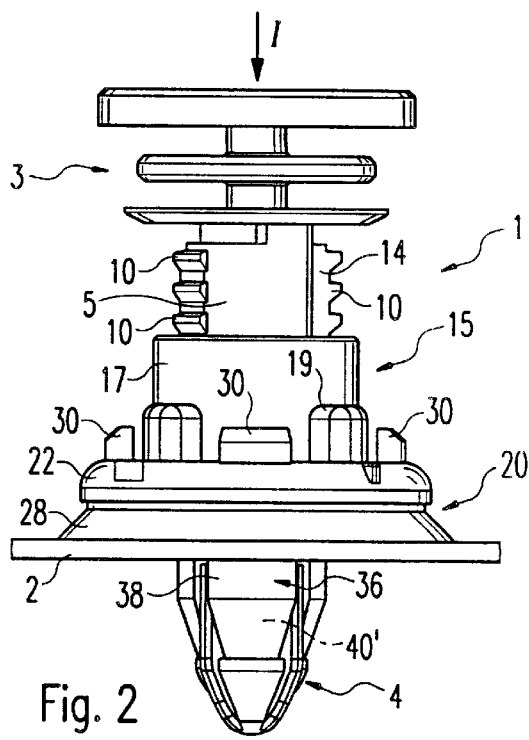
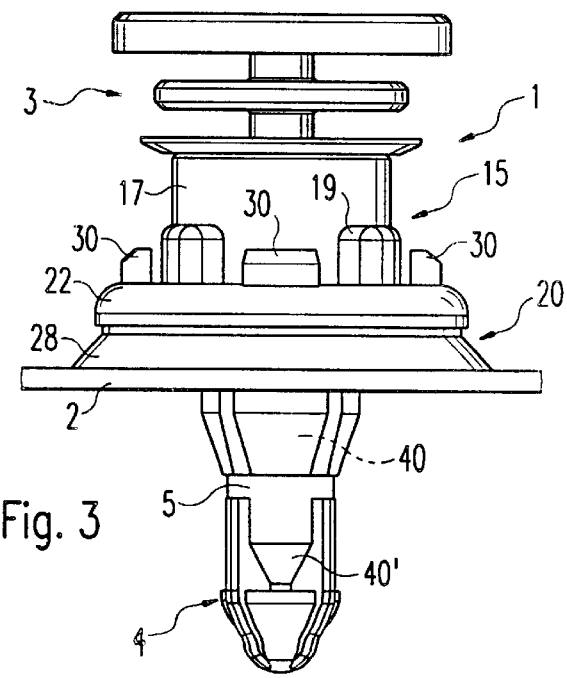

CONNECTION UNIT BETWEEN A SUPPORT, SPECIFICALLY A BODY PART OF A MOTOR VEHICLE AND A PLATE ELEMENT

BACKGROUND OF THE INVENTION

The present invention relates to a connection unit between a support and a plate element having an upper part, which is attachable to the plate element, and a lower part, which is connectable with a support. It finds particular application in conjunction with a connection unit between a body part of a motor vehicle and a face of a door or a wall of the vehicle and will be described with particular reference thereto. It will be appreciated, however, that the invention is also amenable to other like applications.

Heretofore, a connection element such as one disclosed in European Patent EP 0 726 401 A1 includes two (2) flanges, having different elasticities, which are arranged above a circumferential elastic sealing lip. The two (2) flanges are inserted laterally into pockets of a contact region of the upper piece. When in a mounted position, a lower sealing lip acts upon the upper region of a support for establishing a substantially sealed connection.

A connection element such as one disclosed in German Patent DE 4 014 589 C1 includes an upper piece fastenable to a plate element, a middle piece, and a holding element. One drawback to this type of construction is that tolerance compensation, which is specifically required in the automotive industry, is only possible in the plane extending parallel to the support.

A connection element proposed in German Patent Application No. 197 53 678.6 includes an upper piece and a lower piece. A neck-shaped intermediate region, equipped with locking elements, is provided between the upper and lower pieces. The intermediate region penetrates into a support opening embeddable contact piece.

The present invention provides a new and improved apparatus and method which overcomes the above-referenced problems and others.

SUMMARY OF THE INVENTION

A connection unit, between a support, including a body part of a motor vehicle, and a plate element, including one of a door and a wall face, includes a connection element having an upper piece attachable to the plate element and a lower piece connectable with the support. A neck-shaped intermediate zone is included between the upper piece and the lower piece. Locking elements are located along the intermediate zone and penetrate into a support opening of an embeddable contact piece. A casing part surrounds the intermediate zone above the support. The casing part is lockable with the locking elements and the contact piece. A sealing element is included between the casing part and the embeddable contact piece for engaging a surface of the support.

In accordance with one aspect of the invention, the casing part includes a jacket region. An inside surface of the jacket region includes counter stops for engaging the locking elements of the intermediate zone.

In accordance with another aspect of the invention, a portion of the casing part below the jacket region includes a flange. The flange covers at least a portion of the sealing element.

In accordance with a more limited aspect of the invention, the contact piece includes at least two resilient stop strips, the stop strips extend through, and are secured behind, openings of the flange when the connection unit is in a mounted position.

In accordance with a more limited aspect of the invention, each of the stop strips is arranged across from another one of the stop strips.

In accordance with another aspect of the invention, the contact piece includes a disc region. An outside portion of the disc region is connected with the stop strips. An inside portion of the disc region includes a casing region extending through the support opening.

In accordance with a more limited aspect of the invention, at least a partial length of the intermediate zone extends through the casing region. The casing region is lockable with the intermediate zone.

In accordance with a more limited aspect of the invention, the casing region includes a plurality of resilient contact tongues. An inside portion of each of the tongues is embeddable in counter stops positioned axially along the intermediate region.

In accordance with a more limited aspect of the invention, each of the contact tongues includes a conically tapering shape.

In accordance with another aspect of the invention, the sealing element includes openings. The stop strips extend through the sealing element openings. The sealing element includes a circumferential bulge clamped between a convex terminal edge of the flange and an outside surface of the respective stop strip.

In accordance with a more limited aspect of the invention, an outer surface of the sealing element includes a sealing lip for engaging the support. An inner surface of the sealing element includes a sealing plate clamped between an underside of the flange and a surface of the disc region.

In accordance with a more limited aspect of the invention, a surface of the sealing plate includes a terminal ring. An exterior surface of the terminal ring engages an interior surface of the casing region.

In accordance with a more limited aspect of the invention, the terminal ring includes a funnel opening for accepting the intermediate region.

In accordance with another aspect of the invention, the locking elements are positioned along strips of the intermediate region.

In accordance with another aspect of the invention, the jacket region includes a plurality of external ribs.

In accordance with another aspect of the invention, at least one surface of the terminal ring includes at least one rib.

One advantage of the present invention is that simple pre-mounting is possible with respect to inserting the connection unit into the support, whereby an improved seal is obtained after the installation is completed.

Another advantage of the present invention is that significant improvements with respect to the sealing effect of the entire connection unit is obtained by the casing component.

Another advantage of the present invention is that possible mechanical effects upon the sealing element are avoided after the installation of the connection unit is achieved.

Another advantage of the present invention is that locking elements provide a secure connection between the contact piece and the casing component.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIGS. 1a–1d illustrate an exploded schematic lateral view of the individual components of the connection unit according to the present invention;

FIG. 2 illustrates a specific embodiment of the connection unit in a pre-mounted position;

FIG. 3 illustrates the specific embodiment of FIG. 2 after completion of the final installation;

DETAILED DESCRIPTION OF THE PREFERRED EMBODIMENTS

Figure 4:
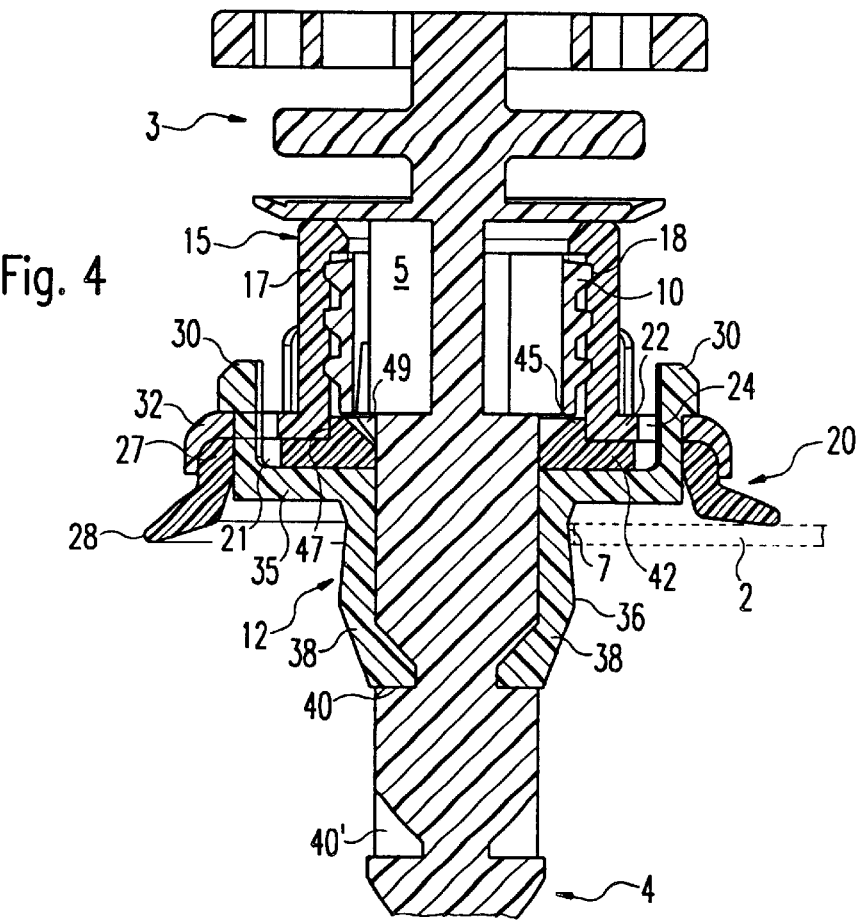
FIG. 4 illustrates a center section through the connection unit according to the present invention after completion of the final installation.

With reference to FIGS. 1a–1d, the unit according to the present invention includes four (4) parts. Specifically, the unit includes a connection element 1 having an upper piece 3, attached to a plate element, and a lower piece 4, connected with a support element 2. Counter stops 40, 40' are located along an axis of the lower piece 4. A neck-shaped intermediate region 5 includes locking elements 10. The locking elements 10 are arranged at strips 14 of the intermediate zone 5. Preferably, the unit includes a plastic material.

FIG. 1b illustrates a casing component 15 including a jacket zone 17. As shown in FIG. 4, an interior surface of the jacket zone 17 is fitted with counter stops 18. The counter stops 18 are sized for engaging the locking elements 10 of the intermediate zone 5.

The casing component 15, which is located above the jacket component 17, includes a flange 22. The flange 22 partially covers the sealing element 20 via an arched end region 32. The jacket region 17 of the casing component 15 is fitted with several outside ribs 19 (see FIG. 1b).

As illustrated in FIG. 1c, a sealing element includes a circumferential bulge 27 and an adjacent sealing lip 28. As shown in FIG. 4, a sealing plate 42 adjoins the sealing lip 28 or the circumferential bulge 27. The sealing plate 42 passes over and into an end ring 45 (see FIGS 1c and 4). At least one rib 50 is arranged on the surface of the end ring 45.

With reference again to FIG. 4, the end ring 45 includes a funnel opening 49, which is penetrated by the intermediate zone 5. The outer diameter of the end ring 45 is adapted for contacting the inner wall 47 of the jacket zone 17 of the casing component 15.

As illustrated in FIG. 1d, a contact piece 12 includes a disc zone 35. Strips 30 are arranged along an outside portion of the disc zone 35 such that pairs of the strips 30 are arranged across from one another. As is described in more detail below, the strips 30 act to secure the contact piece 12 to the casing component 15 and the sealing element 20. An inside portion of the disc zone 35 passes over and into a casing zone 36. The casing zone 36 extends through a support opening 7. The casing zone 36 of the contact piece 12 comprises at least part of the length of the intermediate zone 5. Furthermore, the casing zone 36 can be locked with the intermediate zone 5. Correspondingly, as shown in FIG. 1d, the casing zone 36 includes several resilient contact tongues 38, which are separated from each other by means of slots. The contact tongues 38 are preferably designed in a conically tapering shape.

Referring to FIG. 2, the four (4) elements (i.e., the connection element 1, the casing component 15, the sealing element 20, and the contact piece 12) are attached, in a pre-mounted position, to the support plate 2. In this configuration, the intermediate zone 5 penetrates the contact piece 12, which is embedded into the support opening 7.

A final installation position of the connection, as represented in FIGS. 3 and 4, is preceded by the pre-installation position illustrated in FIG. 2. In the pre-installation position of FIG. 2, the two (2) contact tongues 38 of the contact piece 12 position themselves into lower counter stops 40' of the intermediate zone 5. Furthermore, it is apparent from FIG. 2 that in the pre-installation position, the stop elements 10 of the intermediate zone 5 are above, and protrude beyond, the jacket zone 17 of the casing component 15.

While in the pre-mounted position, the connection unit of the present invention may be installed into the support opening 7 of the support 2.

The final installation position, which is shown in FIGS. 3 and 4, is achieved by applying pressure, in the direction of arrow I, on the upper piece 3 of the connection element 1 shown in FIG. 2. Applying pressure to the element 1 shown in FIG. 2 causes the contact tongues 38 to be embedded in the counter stops 40 of the intermediate zone 5 (see FIG. 4). Furthermore, the pressure causes the locking elements 10 to engage the corresponding counter stops 18 in the jacket zone 17 of the casing component 15.

The stop strips 30 of the contact component 12 extend through openings 21 of the sealing element 20 and through openings 24 of the casing component 15. The stop strips 30 are locked with their stop noses on the surface of the flange 22 of the casing component 15.

As shown in FIG. 4, the circumferential bulge 27 of the sealing element 20 is clamped between a convex end rim 33 of flange 22 of the casing component 15 and the exterior of the respective stop strip 30. It is evident from FIG. 4 that the sealing plate 42, which adjoins the sealing lip 28 of the sealing element 20, is clamped between the underside of the flange 22 and the surface of the disc region 35 of the contact piece 12.

The circumferential sealing lip 28 of the sealing element 20 acts upon the surface of the support 2 and thus constitutes a secure seal. In as much as the convex end rim 32 of the flange 22 covers the bulge 27 of the sealing element 20, there is concurrently produced, an excellent sealing effect and protection of the entire sealing element 20.

Figure 5:
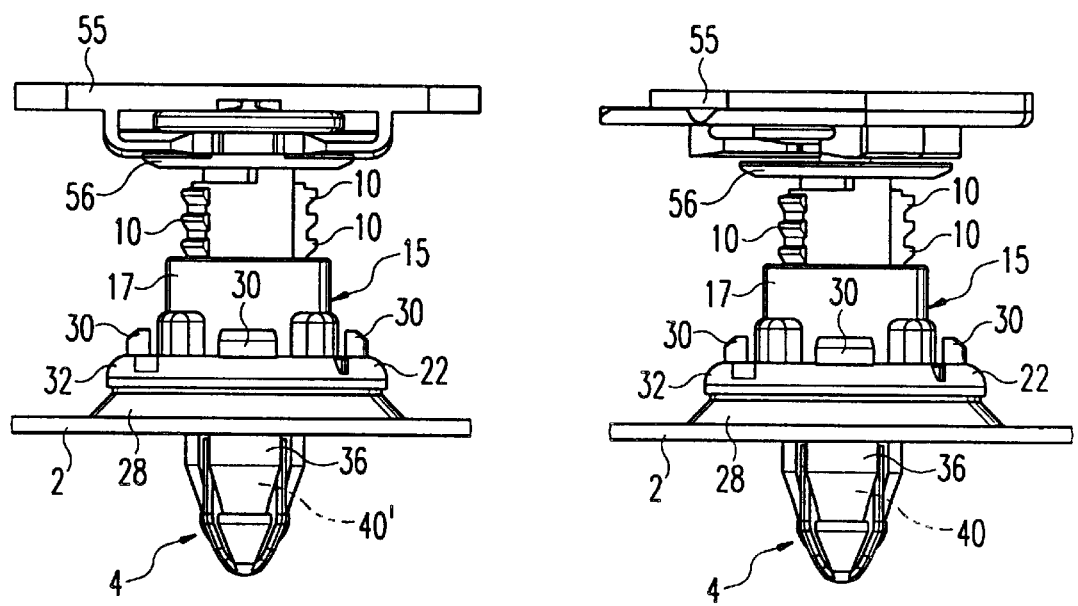
FIG. 5a illustrates a lateral view of a first application possibility for the connection unit according to the present invention.
FIG. 5b illustrates a lateral view of a second application possibility for the connection unit according to the present invention.

In the embodiments of FIGS. 1–4, three (3) disc-like elements are arranged axially along the upper piece 3 of the connection element 1. FIGS. 5a and 5b show only two (2) disc-like elements, whereby the upper element is insertable into a locking element 55 and the lower element serves as a sealing unit 56. The locking element 55 is, for example, a part of a plate element (e.g., a door or wall facing of a motor vehicle). The locking element 55 shown in FIGS. 5a and 5b is inserted from the front into the upper piece 3. According to FIG. 5b, there also exists the possibility that the locking element 55 is inserted laterally into the upper piece 3 of the connection element 1.

Subsequently, the connection element according to the present invention is changed from the pre-installation position illustrated in FIG. 2 to the final installation position shown in FIGS. 3 and 4. In as much as several locking elements 10 of the intermediate zone are employed, and are embeddable in the corresponding counter stops of the casing component 15, excellent tolerance compensation, and a good sealing effect, is achieved in a longitudinal direction of the connection unit.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A connection unit, between a support, including a body part of a motor vehicle, and a plate element, including one of a door and a wall face, comprising:
   a connection element having an upper piece attachable to the plate element and a lower piece connectable with the support;
   a neck-shaped intermediate zone between the upper piece and the lower piece;
   locking elements located along the intermediate zone and penetrating into a support opening of an embeddable contact piece;
   a casing part surrounding the intermediate zone above the support, the casing part being lockable with the locking elements and the contact piece; and
   a sealing element between the casing part and the embeddable contact piece engaging a surface of the support.

2. The connection unit as set forth in claim 1, wherein the casing part includes a jacket region, an inside surface of the jacket region including counter stops for engaging the locking elements of the intermediate zone.

3. The connection unit as set forth in claim 2, wherein a portion of the casing part below the jacket region includes a flange, the flange covering at least a portion of the sealing element.

4. The connection unit as set forth in claim 3, wherein the contact piece includes at least two resilient stop strips, the stop strips extending through, and being secured behind, openings of the flange when the connection unit is in a mounted position.

5. The connection unit as set forth in claim 4, wherein each of the stop strips is arranged across from another one of the stop strips.

6. The connection unit as set forth in claim 4, wherein the contact piece includes a disc region, an outside portion of the disc region being connected with the stop strips, an inside portion of the disc region including a casing region extending through the support opening.

7. The connection unit as set forth in claim 6, wherein at least a partial length of the intermediate zone extends through the casing region, the casing region being lockable with the intermediate zone.

8. The connection unit as set forth in claim 7, wherein the casing region includes a plurality of resilient contact tongues, an inside portion of each of the tongues being embeddable in counter stops positioned axially along the intermediate region.

9. The connection unit as set forth in claim 8, wherein each of the contact tongues includes a conically tapering shape.

10. The connection unit as set forth in claim 4, wherein:
    the sealing element includes openings, the stop strips extending through the sealing element openings; and
    the sealing element includes a circumferential bulge clamped between a convex terminal edge of the flange and an outside surface of the respective stop strip.

11. The connection unit as set forth in claim 10, wherein:
    an outer surface of the sealing element includes a sealing lip for engaging the support; and
    an inner surface of the sealing element includes a sealing plate clamped between an underside of the flange and a surface of the disc region.

12. The connection unit as set forth in claim 11, wherein a surface of the sealing plate includes a terminal ring, an exterior surface of the terminal ring engaging an interior surface of the casing region.

13. The connection unit as set forth in claim 12, wherein the terminal ring includes a funnel opening for accepting the intermediate region.

14. The connection unit as set forth in claim 1, wherein the locking elements are positioned along strips of the intermediate region.

15. The connection unit as set forth in claim 3, wherein the jacket region includes a plurality of external ribs.

16. The connection unit as set forth in claim 12, wherein at least one surface of the terminal ring includes at least one rib.

17. A connection unit, between a first element and a second element, comprising:
    a connection element having an upper piece attachable to the second element and a lower piece connectable with the first element;
    a neck-shaped intermediate zone between the upper piece and the lower piece;
    locking elements located along the intermediate zone;
    an embeddable contact piece, including a support opening and a casing region extending through the support opening, the contact piece being positioned within the first element and the intermediate zone penetrating into the support opening;
    a casing part surrounding the intermediate zone above the first element, the casing part being lockable with the locking elements and the contact piece, the locking elements being positioned above a jacket region of the casing part while the connection unit is in a pre-installation position, and the locking elements being positioned within the jacket region while the connection unit is in a final-installation position; and
    a sealing element between the casing part and the embeddable contact piece engaging a surface of the first element.

18. The connection unit as set forth in claim 17, wherein the locking elements engage corresponding counter-stops within the jacket region while the connection unit is in a final-installation position.

19. The connection unit as set forth in claim 17, wherein:
    the contact piece includes at least one contact tongue, the at least one contact tongue being positioned in first counter stops of the intermediate zone when the connection unit is in the pre-installation position, and the at least one contact tongue being positioned in second counter stops of the intermediate zone when the connection unit is in the final-installation position; and the connection unit transitions between the pre-installation position and the final-installation position when a pressure is applied to the connection element.

20. A method of installing a connection unit between a first element and a second element, comprising:

positioning an embeddable contact piece, including a support opening and a casing region extending through the support opening, in the first element, an intermediate zone of the connection unit penetrating into the support opening;

penetrating an intermediate zone of a connection element into the support opening, the connection element including an upper piece attachable to the second element and a lower piece connectable with the first element, the intermediate zone being neck-shaped and located between the upper piece and the lower piece, a sealing element between a casing part surrounding the intermediate zone and the embeddable contact piece engaging a surface of the first element; and applying a pressure to the connection element for transforming the connection unit from a pre-installation position, when locking elements located along the intermediate zone are positioned above a jacket region of the casing part, to a final-installation position, when the locking elements are positioned within the jacket region and engage corresponding counter-stops within the jacket region.

* * * * *